(12) United States Patent
Maeng et al.

(10) Patent No.: US 9,580,933 B2
(45) Date of Patent: Feb. 28, 2017

(54) APPARATUS FOR DETECTING OPENING AND CLOSING OF DOOR

(71) Applicant: SAMSUNG SDS CO., LTD., Seoul (KR)

(72) Inventors: Chul-Ho Maeng, Anyang-si (KR); Jae-Hoon Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 116 days.

(21) Appl. No.: 14/630,055

(22) Filed: Feb. 24, 2015

(65) Prior Publication Data

US 2016/0115712 A1 Apr. 28, 2016

(30) Foreign Application Priority Data

Oct. 24, 2014 (KR) .................. 10-2014-0145463

(51) Int. Cl.
| | |
|---|---|
| *G01B 7/14* | (2006.01) |
| *E05B 45/06* | (2006.01) |
| *G01D 5/14* | (2006.01) |
| *E05B 47/00* | (2006.01) |

(52) U.S. Cl.
CPC .............. *E05B 45/06* (2013.01); *G01D 5/14* (2013.01); *E05B 2045/063* (2013.01); *E05B 2045/0665* (2013.01); *E05B 2047/0068* (2013.01); *G01D 5/145* (2013.01)

(58) Field of Classification Search
CPC combination set(s) only.
See application file for complete search history.

(56) References Cited

U.S. PATENT DOCUMENTS 6,145,351 A * 11/2000 Levenson ............... E05B 45/06
292/263

FOREIGN PATENT DOCUMENTS

| JP | 9-268836 A | 10/1997 |
|---|---|---|
| JP | 10-48905 A | 2/1998 |
| KR | 20-0224925 Y1 | 5/2001 |
| KR | 20-0465831 Y1 | 3/2013 |

* cited by examiner

*Primary Examiner* — Minh Phan
(74) *Attorney, Agent, or Firm* — Sughrue Mion, PLLC

(57) ABSTRACT

Provided is an apparatus for detecting opening and closing of a door. The apparatus includes a sensor unit, which is installed at a location close to a first member and detects an opening and closing of a door, a loading unit coupled to the sensor unit and a folded unit, folded and rotated based on a center of the folded unit when a back set distance from a side surface of the door to a center line of an indoor unit is small, and led in an installation groove of an indoor unit, and a case coupled to the loading unit when the back set distance from the side surface of the door to the center line of the indoor unit is larger, and separated from the loading unit when the back set distance from the side surface of the door to the center line of the indoor unit is small.

7 Claims, 4 Drawing Sheets

APPARATUS FOR DETECTING OPENING AND CLOSING OF DOOR

CROSS-REFERENCE TO RELATED APPLICATION

This application claims priority under 35 U.S.C. §119 to Korean Patent Application No. 10-2014-0145463 filed on Oct. 24, 2014, the disclosure of which is hereby incorporated by reference in its entirety.

BACKGROUND

Field

Embodiments of the inventive concept relate to a technique for detecting opening and closing of a door, and more particularly, to an apparatus for detecting opening and closing of a door in which, in a digital door lock including an indoor unit and an outdoor unit, which are installed facing each other at the inside and outside of the door, respectively, an installed location of a closed door sensor of the door lock is changed according to a back set distance from a side surface of the door to a center line of the indoor unit.

Description of Related Art

Generally, a digital door lock has a mortise lock including a latch bolt and a dead bolt within a door side, and is divided into a main key, in which an indoor unit and an outdoor unit, to which a handle is coupled, are installed so as to control operations of the latch bolt and the dead bolt of the mortise lock located on the inside and outside surfaces of the door, respectively, and a secondary key including the mortise lock which is installed on the inside surface of the door.

In this case, conventionally, various safety devices, which protect the mortise lock so that the door is prevented from being forcibly opened, are installed at the digital door lock or at the door side, and the safety devices prevent the door from being forcibly opened according to forced release of the mortise lock.

However, the above-described safety devices are merely limited to preventing a forced opening of the door. When the door is forcibly opened, a function capable of detecting the opening has not been provided.

That is, even though the safety devices for preventing the forced opening of the door are strongly installed, the safety devices may be released according to types of state-of-the-art devices, and thus there is only an effect that the forced opening of the door is delayed by a specific time.

Therefore, in addition to the function of preventing the forced opening of the door, if the closing or opening state of the door is detected and then the state is noticed, more stability may be provided in a security function. This applicant has filed the Korean Patent Registration No. 20-0465831 (filed on 2013 Mar. 12) to expect this effect and the inventive concept is to compensate for this prior patent application.

That is, in the prior patent application, an installation groove is installed in the indoor unit and then a rod-shaped magnetic sensor may be installed in the installation groove.

However, when the back set distance is very small, the magnetic sensor is very close to a magnet which is an opening and closing detection unit installed in the door and thus, there is a problem in that an error, the door is determined to be closed even when the door is open, occurs. According to the inventive concept, a disadvantage of the above-described patent application filed and registered by the same applicant is complemented by improving the detection error when the magnetic sensor is installed regardless of the back set distance.

Further, conventionally, as shown in accompanying FIGS. 1 to 3, in a state in which an installation groove 1a having a common depth is formed in an indoor unit 1, when there are different back set distances d1 (shown in FIG. 1), d2 (shown in FIG. 2), and d3 (shown in FIG. 3) (wherein, d1>d2>d3) from a side surface of the door 2 to a center line of the indoor unit 1, sensors 3a (shown in FIG. 1), 3b (shown in FIG. 2), and 3c (shown in FIG. 3) which are manufactured to have different sizes should be mounted. In the case, the sensors are not compatible with each other and economic losses occur due to manufacturing molds according to the sizes of the sensors.

SUMMARY

Embodiments of the inventive concept provide an apparatus for detecting opening and closing of a door, in which, in a state in which an installation groove having a common depth is formed in an indoor unit, a length of a sensor that detects opening and closing of a door lock according to a back set distance from a side surface of the door to a center line of an indoor unit is changed according to whether a case is separated or not, and thus the sensor may smoothly detect the opening and closing of the door regardless of back set distances even though there are different back set distances from the side surface of the door to the center line of the indoor unit and economic losses resulting from manufacturing sensors with different sizes according to the back set distance are prevented.

The technical objectives of the inventive concept are not limited to the above disclosure; other objectives may become apparent to those of ordinary skill in the art based on the following descriptions.

In accordance with an aspect of the inventive concept, an apparatus for detecting opening and closing of a door includes a sensor unit, which is installed at a location close to a first member and detects an opening and closing of a door, a loading unit coupled to the sensor unit and a folded unit, folded and rotated based on a center of the folded unit when a back set distance from a side surface of the door to a center line of an indoor unit is small, and led in an installation groove of an indoor unit, and a case coupled to the loading unit when the back set distance from the side surface of the door to the center line of the indoor unit is larger, and separated from the loading unit when the back set distance from the side surface of the door to the center line of the indoor unit is small.

In an embodiment, an adhesion unit which fixes an installation state is formed on a surface of the sensor unit when the sensor unit is installed close to the first member.

In another embodiment, a pair of symmetrical guide projections are formed on a surface of the loading unit and a guide groove in which the guide projections are mounted is formed in the case.

In still another embodiment, a pair of symmetrical latching projections are formed on ends of a side of the case and a latching groove in which the latching projection is latched is formed in the sensor unit.

In yet another embodiment, the first member is a magnet, a connection terminal for electrical connection is formed in the sensor unit, and a connector connected to the connection terminal is formed inside the installation groove.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Hereinafter, exemplary embodiments of the inventive concept will be described with reference to the accompanying drawings.

Figure 1:
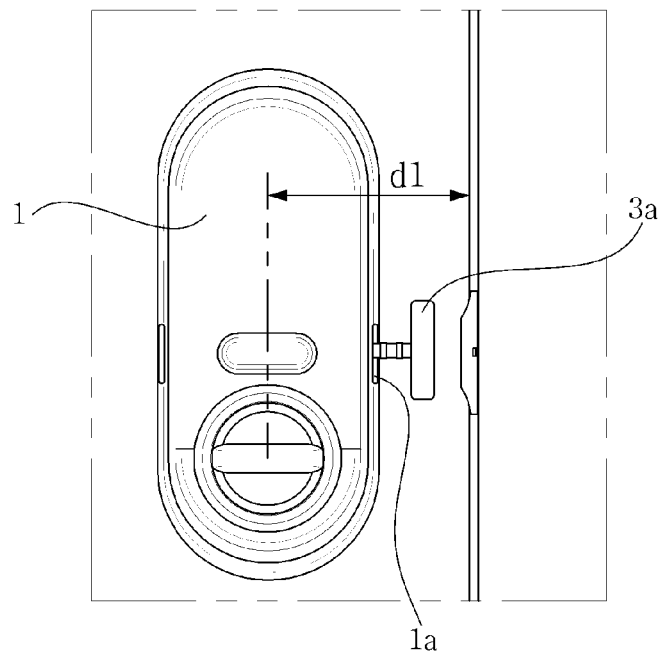
FIGS. 1 and 2 are views showing installation states of conventional sensors in which an indoor unit is installed to have back set distances d1 and d2 further away from a side surface of a door.
Figure 2:
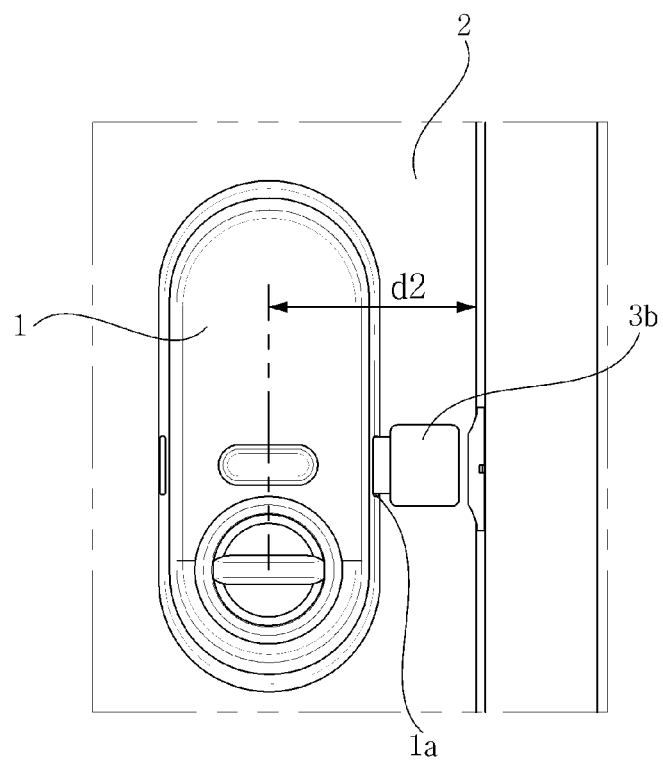
Figure 3:
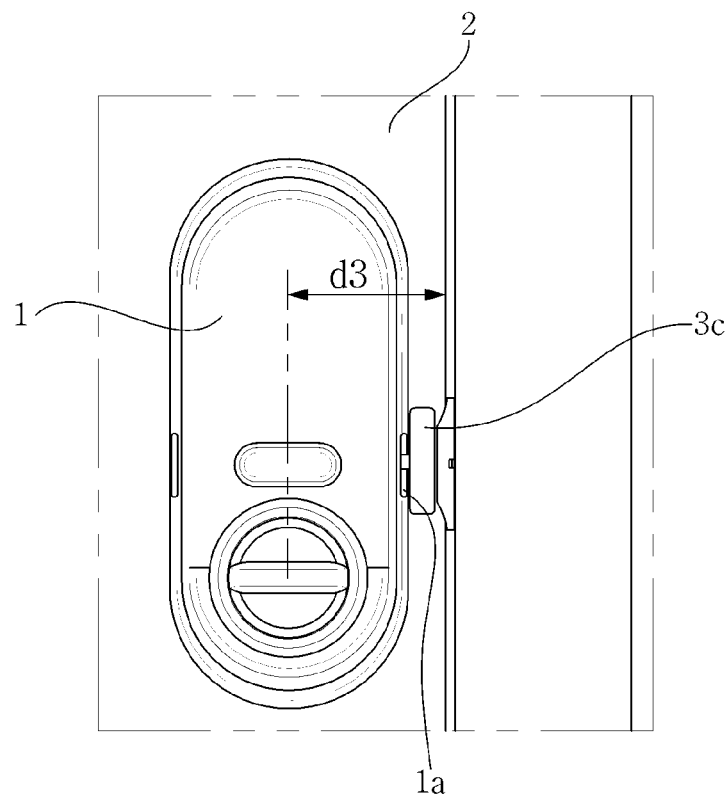
FIG. 3 is a view showing an installation state of a conventional sensor in which an indoor unit is installed to have a back set distance d3 close to a side surface of a door.
Figure 4:
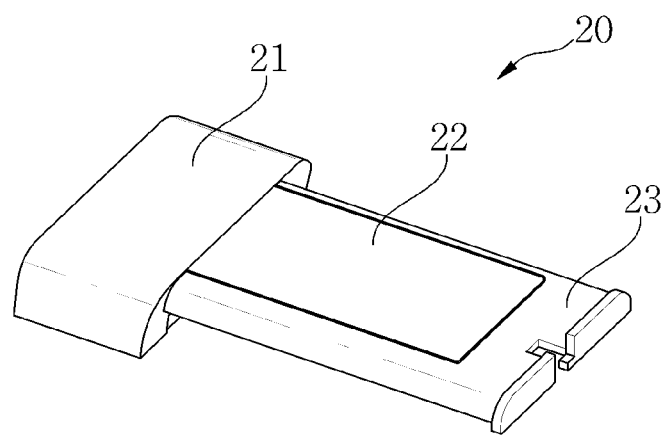
FIG. 4 is a perspective view showing a structure in which a sensor unit is coupled to a case in accordance with an embodiment of the inventive concept.
Figure 5:
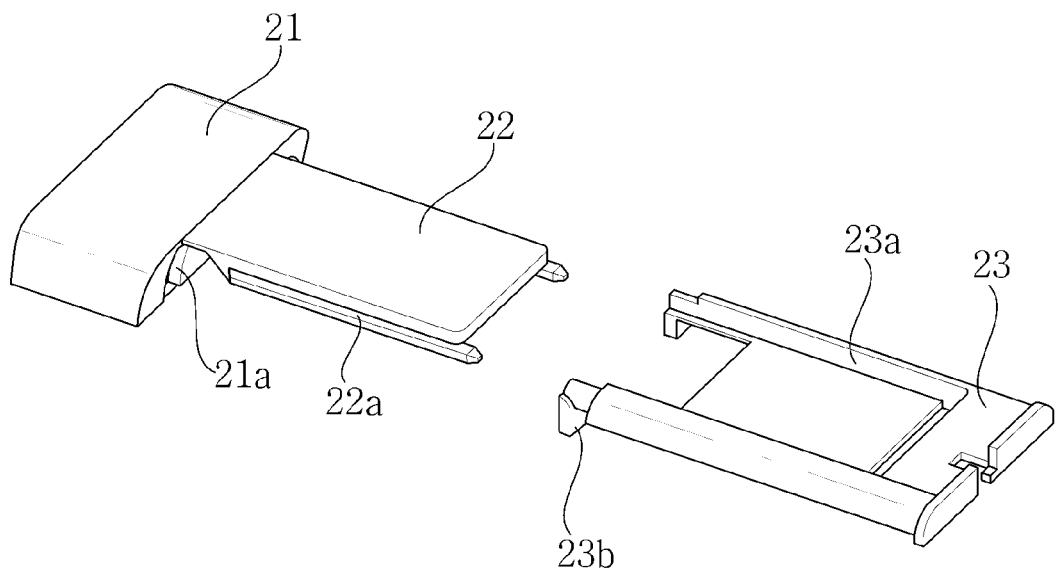
FIG. 5 is a perspective view showing a structure in which a sensor unit is separated from a case in accordance with an embodiment of the inventive concept.
Figure 6:
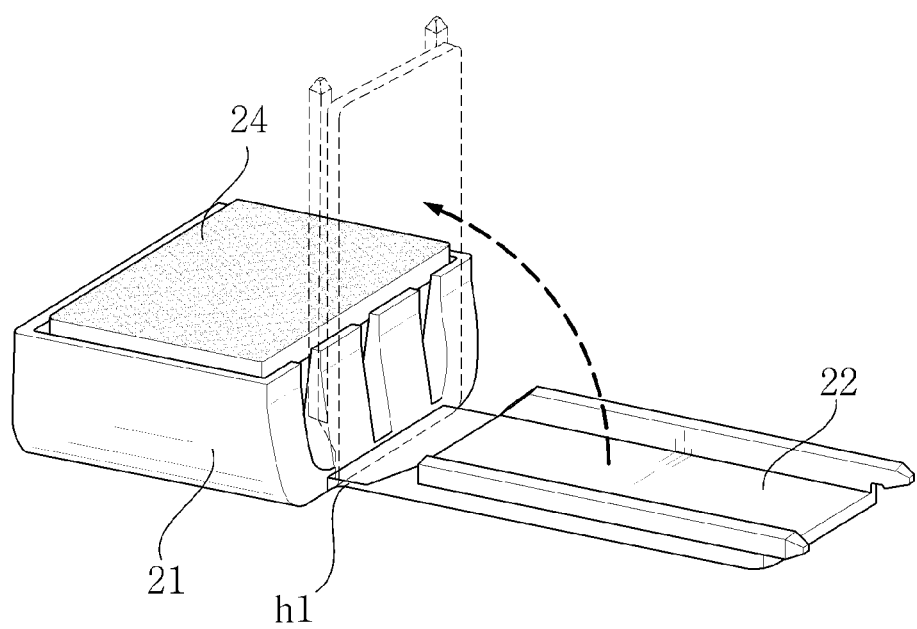
FIG. 6 is a perspective view showing folding and rotation of a loading unit from a sensor unit in accordance with an embodiment of the inventive concept.

FIG. 4 is a perspective view showing a structure in which a sensor unit is coupled to a case in accordance with an embodiment of the inventive concept, FIG. 5 is a perspective view showing a structure in which a sensor unit is separated from a case in accordance with an embodiment of the inventive concept, and FIG. 6 is a perspective view showing folding and rotation of a loading unit from a sensor unit in accordance with an embodiment of the inventive concept.

Figure 7:
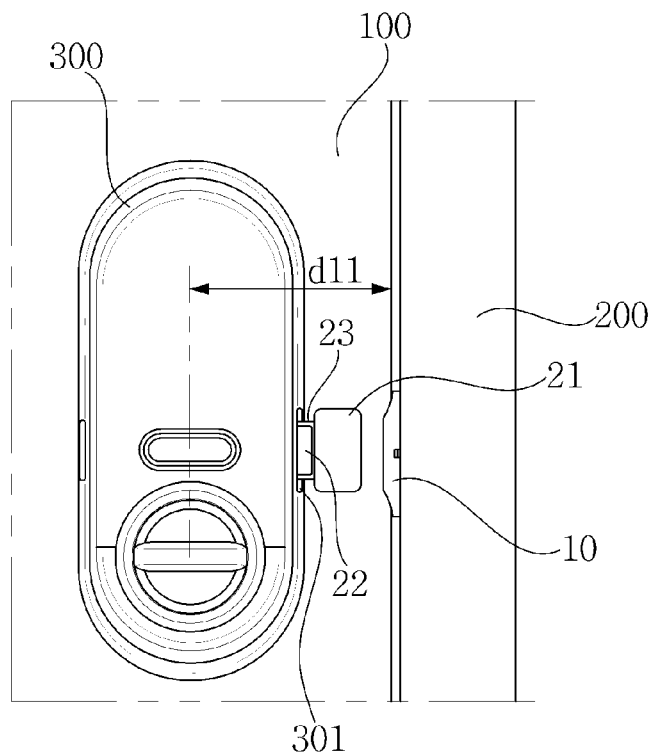
FIG. 7 is a view showing an installation state of a sensor unit in which an indoor unit is installed to have a back set distance d11 further away from a side surface of a door in accordance with an embodiment of the inventive concept.
Figure 8:
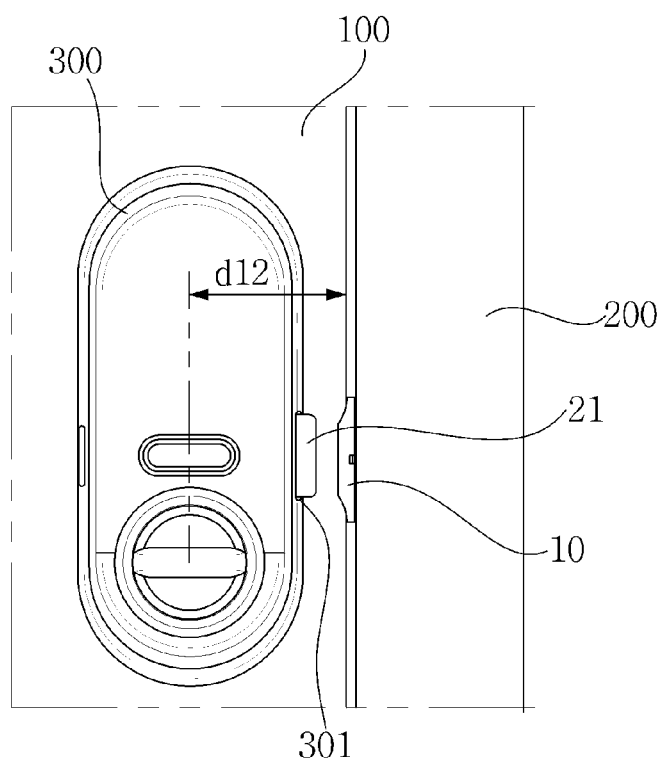
FIG. 8 is a view showing an installation state of a sensor unit in which an indoor unit is installed to have a back set distance d12 close to a side surface of a door in accordance with an embodiment of the inventive concept.

FIG. 7 is a view showing an installation state of a sensor unit in which an indoor unit is installed to have a back set distance d11 from a side surface of a door in accordance with an embodiment of the inventive concept and FIG. 8 is a view showing an installation state of a sensor unit in which an indoor unit is installed to have a back set distance d12 close to a side surface of a door in accordance with an embodiment of the inventive concept.

Referring to the accompanying FIGS. 4 to 8, the apparatus for detecting opening and closing of a door in accordance with the embodiment of the inventive concept is applied to an indoor unit 300 in which an installation groove 301 is formed and to a doorframe 200 of a door 100, and includes a first member 10 which is a magnet and a sensor member 20 which is a magnetic sensor.

The first member 10 is a magnet installed in the doorframe 200 of the door 100 or on a wall in order to detect opening and closing of the door 100.

The sensor member 20 is installed in the installation groove 301 of the indoor unit 300 so as to be as close as possible to the first member 10 and then outputs a signal for detecting the opening and closing of the door 100 when an installation length is changed according to the back set distances d11 and d12 (wherein, d11>d12) from the side surface of the door 100 to a center line of the indoor unit 300. The sensor member 20 includes a sensor unit 21, a loading unit 22, a case 23, and an adhesion unit 24.

As the sensor unit 21 is a magnetic sensor, the sensor unit 21 is installed at a location close to the first member 10 which is a magnet and is configured to output the signal for detecting the opening and closing of the door 100.

That is, when the door 100 is in an open state, the sensor unit 21 may not detect a magnetic force generated by the first member 10. However, when the door 100 is in a closed state, the sensor unit 21 may detect the magnetic force generated from the first member 10.

The loading unit 22 is configured to be folded and rotated based on a folded unit h1 and to be led in the installation groove 301 so that the sensor unit 21 detects the first member 10 so as to detect the opening and closing of the door 100 when the back set distance d12 from the side surface of the door 100 to the center line of the indoor unit 300 is small.

The case 23 is configured to be coupled to the loading unit 22 when the back set distance d11 from the side surface of the door 100 to the center line of the indoor unit 300 is larger, and to be separated from the loading unit 22 when the back set distance d12 from the side surface of the door 100 to the center line of the indoor unit 300 is small.

In this case, a pair of symmetrical guide projections 22a are formed on a surface of the loading unit 22, guide grooves 23a in which the guide projections 22a are mounted are formed in the case 23, a pair of symmetrical latching projections 23b are formed on ends of a side of the case 23, and latching grooves 21a to which the latching projections 23b are latched are formed in the sensor unit 21, and thus the case 23 is configured to be strongly coupled and fixed to the loading unit 22.

The adhesion unit 24 is formed on a surface of the sensor unit 21 to fix an installation state when the sensor unit 21 is installed close to the first member 10 from a folding and rotation of the case 23 or the loading unit 22. The adhesion unit 24 is configured to adhere to a surface of the door 100.

Here, although not shown in the sensor unit 21 of the drawing, a connection terminal for electrical connection is formed therein and a connector (not shown) connected to the connection terminal is formed inside the installation groove 301.

That is, although not shown in the drawings, the connector is formed on a control board of the digital door lock so as to be electrically connected to a controller (not shown) provided on the control board. The connector is located in the installation groove 301 of the indoor unit 300 and may be connected to the connection terminal formed on the sensor unit 21 when the loading unit 22 of the sensor member 20 is led in the installation groove 301.

Therefore, the sensor unit 21 outputs the signal for detecting the opening and closing of the door 100 according to a distance between the sensor unit 21 and the first member 10. The output detection signal is transmitted to the controller of the digital door lock through the connected connector and connection terminal. The controller may control the digital door lock so that a locking operation of the mortise lock is automatically performed when the door 100 is in a closed state and a control operation in which an alarm output unit (not shown) outputs an alarm which indicates the open door is performed when the door 100 is in an open state.

According to the embodiments of the inventive concept, as shown in FIGS. 4 to 8, first, in the case in which the indoor unit 300 is installed on the surface of the door 100 according to an installation location of the first member 10, which is a magnet and is installed on the doorframe 200 or on the wall, the case 23 is coupled to the loading unit 22 included in the sensor member 20 when the back set distance d11 from the side surface of the door 100 to the center of the indoor unit 300 is larger, as shown in FIG. 7.

That is, when the case 23 is coupled to the loading unit 22, the guide projections 22a formed on the surface of the loading unit 22 are inserted and coupled to the guide grooves 23a formed in the case 23. When the coupling is completed, the latching projections 23b formed on ends of the side of the case 23 are latched to the latching grooves 21a formed in the sensor unit 21 and then the coupling of the case 23 to the loading unit 22 is completed.

Then, in a state in which the loading unit 22 to which the case 23 is coupled is led to the installation groove 301 of the indoor unit 300 and thus the sensor unit 21 is close to the side surface of the door 100, the sensor unit 21 adheres and is fixed to the surface of the door 100 through the adhesion unit 24 formed on the surface of the sensor unit 21.

Thus, the sensor unit 21 is installed close to the first member 10, which is a magnet and is installed on the doorframe 200 or on the wall, and thus may detect the opening and closing of the door 100.

Meanwhile, the case 23 is separated from the loading unit 22 included in the sensor member 20 when the back set distance d12 from the side surface of the door 100 to the center of the indoor unit 300 is small, as shown in FIG. 8.

Then, when the loading unit 22 is led in the installation groove 301 of the indoor unit 300 in a state in which the loading unit 22 is folded and rotated based on the folded unit h1, the adhesion unit 24 formed on the surface of the sensor unit 21 adheres and is fixed to the surface of the indoor unit 300, the sensor unit 21 is installed close to the first member 10, which is a magnet and is installed on the doorframe 200 or on the wall, and thus the sensor unit 21 may detect the opening and closing of the door 100 accurately.

According to the apparatus for detecting opening and closing of a door, in a state in which an installation groove having a common depth is formed in an indoor unit, a length of a sensor that detects opening and closing of a door lock according to a back set distance from a side surface of the door to a center line of an indoor unit is changed according to whether a case is separated or not, and thus the sensor can smoothly detect the opening and closing of the door regardless of back set distances even though there are different back set distances from the side surface of the door to the center line of the indoor unit and economic losses resulting from manufacturing sensors with different sizes according to the back set distance can be prevented.

According to the embodiments of the inventive concept, the apparatus for detecting opening and closing of the door can be applied to a door lock, in which the sensor smoothly detects the opening and closing of the door regardless of back set distances even though there are different back set distances from the side surface of the door to the center line of the indoor unit, and economic losses resulting from manufacturing sensors with different sizes according to the back set distance are prevented.

The above-described exemplary embodiments should be considered in a descriptive sense only and the inventive concept is not limited thereto. It will be apparent to those skilled in the art that various modifications and improvements may be made within the scope of the inventive concept.

What is claimed is:

1. An apparatus for detecting opening and closing of a door, the apparatus comprising:
    a sensor unit moves with respect to a first member and configured to detect an opening and closing of a door;
    a loading unit coupled to the sensor unit and configured to be folded and rotated with respect to a folded unit attached to the sensor unit when a back set distance from a side surface of the door to a center line of an indoor unit is smaller than a predetermined value, and configured to be inserted into an installation groove of the indoor unit; and
    a case coupled to the loading unit when the back set distance from the side surface of the door to the center line of the indoor unit is larger than the predetermined value, and separated from the loading unit when the back set distance from the side surface of the door to the center line of the indoor unit is smaller than the predetermined value.

2. The apparatus of claim 1, wherein the sensor unit comprises an adhesion unit provided on a surface of the sensor unit, the adhesion unit being configured to fix the sensor unit to the door when a distance between the sensor unit and the first member is less than a predetermined distance, and the loading unit is led in the installation groove of the indoor unit in a state in which the loading unit is folded and rotated based on the folded unit.

3. The apparatus of claim 1, wherein the loading unit comprises: a pair of symmetrical guide projections provided on a surface of the loading unit, and the cases comprises a guide groove in which the guide projections are guided.

4. The apparatus of claim 1, wherein the case comprises a pair of symmetrical latching projections provided on ends of a side of the case, and the sensor unit comprises latching grooves in which the latching projections are latched.

5. The apparatus of claim 1, wherein the first member is a magnet,
    wherein the sensor unit comprises a connection terminal for electrical connection, and
    wherein the installation groove comprises a connector configured to be connected to the connection terminal and provided inside the installation groove.

6. An apparatus for detecting opening and closing of a door, the apparatus comprising:
    a first member provided on a door frame; and
    an indoor unit provided on a door corresponding to the door frame and comprising a sensor member configured to detect the first member,
    wherein the sensor member comprises:
        a sensor unit configured to detect an opening and closing of a door;
        a loading unit coupled to the sensor unit and configured to be folded and rotated with respect to a folded unit attached to the sensor unit when a back set distance from a side surface of the door to a center line of an indoor unit is smaller than a predetermined value, and configured to be inserted into an installation groove of the indoor unit; and
        a case coupled to the loading unit when the back set distance from the side surface of the door to the center line of the indoor unit is larger than the predetermined value, and separated from the loading unit when the back set distance from the side surface of the door to the center line of the indoor unit is smaller than the predetermined value.

7. The apparatus of claim 6, wherein the first member is a magnet.

* * * * *